US012711383B2

(12) United States Patent
Inoue

(10) Patent No.: US 12,711,383 B2
(45) Date of Patent: Aug. 18, 2026

(54) ACCURATE ENSEMBLE BY MUTATING NEURAL NETWORK PARAMETERS

(71) Applicant: INTERNATIONAL BUSINESS MACHINES CORPORATION, Armonk, NY (US)

(72) Inventor: Hiroshi Inoue, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 761 days.

(21) Appl. No.: 16/412,906

(22) Filed: May 15, 2019

(65) Prior Publication Data

US 2020/0364503 A1 Nov. 19, 2020

(51) Int. Cl.

| | |
|---|---|
| ***G06N 3/084*** | (2023.01) |
| ***G06F 18/214*** | (2023.01) |
| ***G06N 3/045*** | (2023.01) |
| ***G06N 5/04*** | (2023.01) |
| ***G06N 20/20*** | (2019.01) |

(52) U.S. Cl.

CPC ......... *G06N 3/084* (2013.01); *G06F 18/2148* (2023.01); *G06N 3/045* (2023.01); *G06N 5/04* (2013.01); *G06N 20/20* (2019.01)

(58) Field of Classification Search

CPC .... G06F 18/2148; G06N 20/20; G06N 3/045; G06N 5/04

USPC .......................................................... 706/12

See application file for complete search history.

(56) References Cited

U.S. PATENT DOCUMENTS

| | | | | |
|---|---|---|---|---|
| 6,067,536 A * | 5/2000 | Maruyama | ............. | G06N 20/00 706/25 |
| 9,928,342 B1 * | 3/2018 | LaBorde | ................ | G06N 3/048 |
| 11,106,978 B2 * | 8/2021 | Andoni | ............... | H04L 63/1425 |

(Continued)

FOREIGN PATENT DOCUMENTS

| | | |
|---|---|---|
| CN | 1808414 A | 7/2006 |
| CN | 101251851 A | 8/2008 |

(Continued)

OTHER PUBLICATIONS

Palmes et al, 2005, "Mutation-Based Genetic Neural Network" (Year: 2005).*

(Continued)

*Primary Examiner* — Abdullah Al Kawsar
*Assistant Examiner* — Jun Kwon
(74) *Attorney, Agent, or Firm* — CHIP LAW GROUP

(57) ABSTRACT

A computer-implemented method is provided for reducing training costs for an ensemble of machine-learning-based classifiers. The method includes training, by a processor, a given machine-learning-based classifier from among the ensemble to obtain a trained classifier. The method further includes dumping, by the processor, parameters used to train the trained classifier to obtain dumped parameters. The method also includes recording, by the processor, change rates of each of the dumped parameters. The method additionally includes creating, by the processor without training, a new classifier from at least one other machine-learning-based classifier in the ensemble by calculating the dumped parameters plus change rates times random numbers for each local prediction by the trained classifier.

20 Claims, 6 Drawing Sheets

(56) References Cited

U.S. PATENT DOCUMENTS

2004/0254901 A1* 12/2004 Bonabeau .............. G06N 3/126 706/13
2006/0184471 A1 8/2006 Minamino et al.
2007/0043513 A1* 2/2007 Vandecasteele ....... G06N 3/126 702/20
2015/0324688 A1 11/2015 Wierzynski et al.
2016/0063396 A1 3/2016 Cheng et al.
2019/0080240 A1 3/2019 Andoni et al.
2019/0220748 A1 7/2019 Denil et al.
2019/0318202 A1 10/2019 Zhao et al.
2019/0377825 A1* 12/2019 Chang ................... G06F 16/328
2020/0356770 A1* 11/2020 Tanner ................. G06V 30/413

FOREIGN PATENT DOCUMENTS

CN 105373800 A 3/2016
CN 106548210 A 3/2017
CN 106575377 A 4/2017
CN 109313721 A 2/2019
CN 109739980 A 5/2019
DE 102010046191 A1 5/2011
DE 102010046919 A1 5/2011
EP 1873687 A2 1/2008
WO WO2015039021 A2 3/2015
WO WO2015175154 A1 11/2015

OTHER PUBLICATIONS

Saxena, 2007, "Evolving an artificial neural network classifier for condition monitoring of rotating mechanical systems" (Year: 2007).*
Xu, 2014, "Ensemble Learning" (Year: 2014).*
Rao, 2016, "A Collaborative Filtering Recommender System with Randomized Learning Rate and Regularized Parameter" (Year: 2016).*
Fogel, 1989, "Evolving Neural Networks" (Year: 1989).*
Chinese Office Action issued in corresponding Application No. CN 202010340859.2 dated Feb. 27, 2024, pp. 1-8.
The State Intellectual Property Office of People's Republic of China, "Notice of Rejection", Nov. 29, 2024, 6 Pages, CN Application No. 202010340859.2.

* cited by examiner

500

ACCURATE ENSEMBLE BY MUTATING NEURAL NETWORK PARAMETERS

BACKGROUND

The present invention generally relates to machine learning, and more particularly to an accurate ensemble by mutating neural network parameters.

In machine-learning-based classification task which predict a class label for each input, an ensemble technique is often used to get better accuracy. With the ensemble method, the final classification result is obtained by ensembling (e.g., averaging) multiple local predictions; local predictions are based on different classifiers or based on a slightly modified (e.g., with cropping or flipping) input image.

Thus, in general, more accurate and independent local predictions result in a better final result by ensembling them. Independent classifiers can be obtained by training multiple classifiers from scratch independently. However, the same incurs a cost to train multiple classifiers. Hence, there is a need for a low cost approach to training multiple classifiers for ensembling.

SUMMARY

According to an aspect of the present invention, a computer-implemented method is provided for reducing training costs for an ensemble of machine-learning-based classifiers. The method includes training, by a processor, a given machine-learning-based classifier from among the ensemble to obtain a trained classifier. The method further includes dumping, by the processor, parameters used to train the trained classifier to obtain dumped parameters. The method also includes recording, by the processor, change rates of each of the dumped parameters. The method additionally includes creating, by the processor without training, a new classifier from at least one other machine-learning-based classifier in the ensemble by calculating the dumped parameters plus change rates times random numbers for each local prediction by the trained classifier.

According to another aspect of the present invention, a computer program product is provided for reducing training costs for an ensemble of machine-learning-based classifiers. The computer program product includes a non-transitory computer readable storage medium having program instructions embodied therewith. The program instructions are executable by a computer to cause the computer to perform a method. The method includes training, by a processor of the computer, a given machine-learning-based classifier from among the ensemble to obtain a trained classifier. The method further includes dumping, by the processor, parameters used to train the trained classifier to obtain dumped parameters. The method also includes recording, by the processor, change rates of each of the dumped parameters. The method additionally includes creating, by the processor without training, a new classifier from at least one other machine-learning-based classifier in the ensemble by calculating the dumped parameters plus change rates times random numbers for each local prediction by the trained classifier.

According to yet another aspect of the present invention, a computer processing system is provided for reducing training costs for an ensemble of machine-learning-based classifiers. The system includes a memory for storing program code. The system further includes a hardware processor for running the program code to train a given machine-learning-based classifier from among the ensemble to obtain a trained classifier. The hardware processor also runs the program code to dump parameters used to train the trained classifier to obtain dumped parameters. The hardware processor additionally runs the program code to record change rates of each of the dumped parameters. The hardware processor further runs the program code to create, without training, a new classifier from at least one other machine-learning-based classifier in the ensemble by calculating the dumped parameters plus change rates times random numbers for each local prediction by the trained classifier.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

The present invention is directed to an accurate ensemble by mutating neural network parameters.

Various embodiments of the present invention achieve higher accuracy than conventional approaches to using an ensemble method, by making local predictions more independent with respect to each other without incurring any additional training cost.

In an embodiment, parameters such as training weights are mutated in consideration of a change rate of each of the parameters. In this way, accuracy degradation is avoided.

In an embodiment, parameters used to train a given classifier/NN in an ensemble of neural networks are dumped and mutated to provide a new trained classifier without having to explicitly train the new classifier since the new classifier uses mutated parameters of the already trained classifier. In this way, training costs are reduced for ensembles of neural networks.

In machine learning, a hyperparameter is a parameter whose value is set before the learning process begins. By contrast, the values of other parameters are derived via training. Given these hyperparameters, the training algorithm learns the parameters from the data. Parameters can include, for example, but are not limited to, the weights in an artificial neural network, the support vectors in a support vector machine, the coefficients in a logistic regression or logarithmic regression, the mean and standard deviation in a Gaussian distribution, the tuning parameters in a nearest neighbor classification, and so forth. One or more embodiments of the present invention are directed to non-hyperparameters, hereinafter referred to interchangeably as "parameters" in short.

Thus, while weights of an ANN are described herein as a parameter that is mutated in accordance with one or more illustrative embodiments of the present invention, other parameters can be used depending on the implementation and the type of learning mechanism used, as readily appreciated by one of ordinary skill in the art. For example, in an embodiment, the support vectors in a support vector machine, the coefficients in a logistic regression or logarithmic regression, the mean and standard deviation in a Gaussian distribution, the tuning parameters in a nearest neighbor classification, and so forth can be used.

Figure 1:
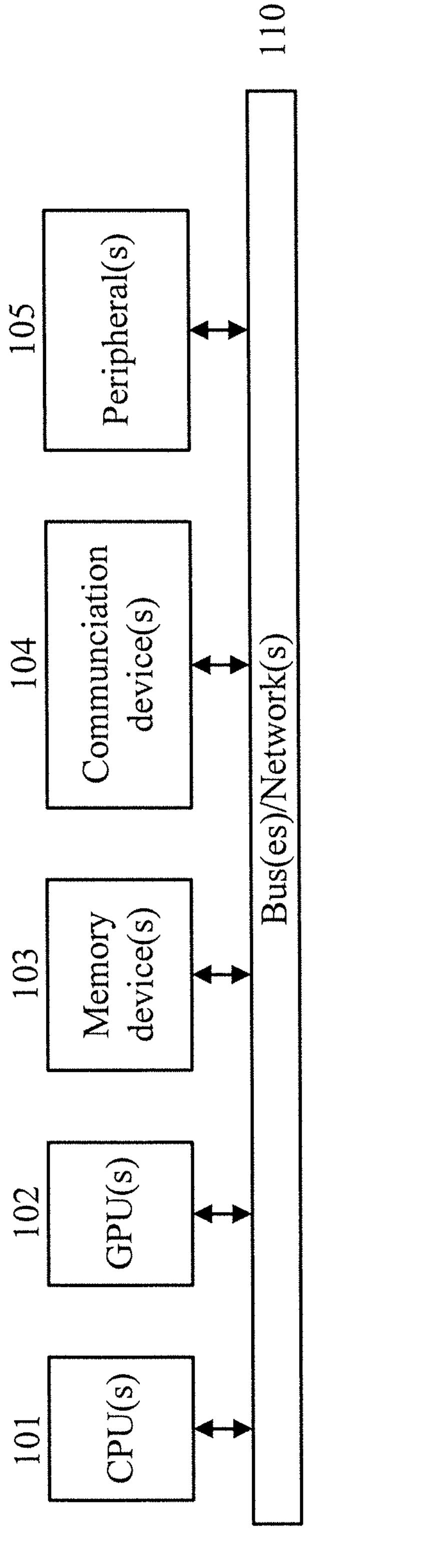
FIG. 1 is a block diagram showing an exemplary processing system to which the present invention may be applied, in accordance with an embodiment of the present invention.

Hence, in other embodiments, a similar formula can be used as that described herein for weights where random numbers, preferably small numbers (e.g., non-integers, or integers up to 2) such as within a predefined range (e.g., 0.5-2) are used to mutate the parameter values to obtain mutated values. The mutated values will represent a trained model, e.g., a trained ANN in an ensemble of ANNs, that is, a new classifier/predictor in an ensemble of classifiers/predictors, without having to perform any actual training of the new classifier/predictor. Rather, the calculations of the mutated values replace and/or otherwise supplant the training process that is conventionally performed but avoided by the present invention FIG. 1 is a block diagram showing an exemplary processing system 100 to which the present invention may be applied, in accordance with an embodiment of the present invention. The processing system 100 includes a set of processing units (e.g., CPUs) 101, a set of GPUs 102, a set of memory devices 103, a set of communication devices 104, and set of peripherals 105. The CPUs 101 can be single or multi-core CPUs. The GPUs 102 can be single or multi-core GPUs. The one or more memory devices 103 can include caches, RAMs, ROMs, and other memories (flash, optical, magnetic, etc.). The communication devices 104 can include wireless and/or wired communication devices (e.g., network (e.g., WIFI, etc.) adapters, etc.). The peripherals 105 can include a display device, a user input device, a printer, an imaging device, and so forth. Elements of processing system 100 are connected by one or more buses or networks (collectively denoted by the figure reference numeral 110).

In an embodiment, memory devices 103 can store specially programmed software modules in order to transform the computer processing system into a special purpose computer configured to implement various aspects of the present invention. In an embodiment, special purpose hardware (e.g., Application Specific Integrated Circuits, and so forth) can be used to implement various aspects of the present invention.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present invention provided herein.

Moreover, it is to be appreciated that various figures as described below with respect to various elements and steps relating to the present invention that may be implemented, in whole or in part, by one or more of the elements of system 100.

The present invention is directed to reducing additional training costs for neural networks. Accordingly, a description of a general neural network is provided relative to FIG. 2, and an architecture of a neural network is provided relative to FIG. 3. Various aspects of the present invention as described thereafter.

An artificial neural network (ANN) is an information processing system that is inspired by biological nervous systems, such as the brain. The key element of ANNs is the structure of the information processing system, which includes a large number of highly interconnected processing elements (called "neurons") working in parallel to solve specific problems. ANNs are furthermore trained in-use, with learning that involves adjustments to weights that exist between the neurons. An ANN is configured for a specific application, such as pattern recognition or data classification, through such a learning process.

Figure 2:
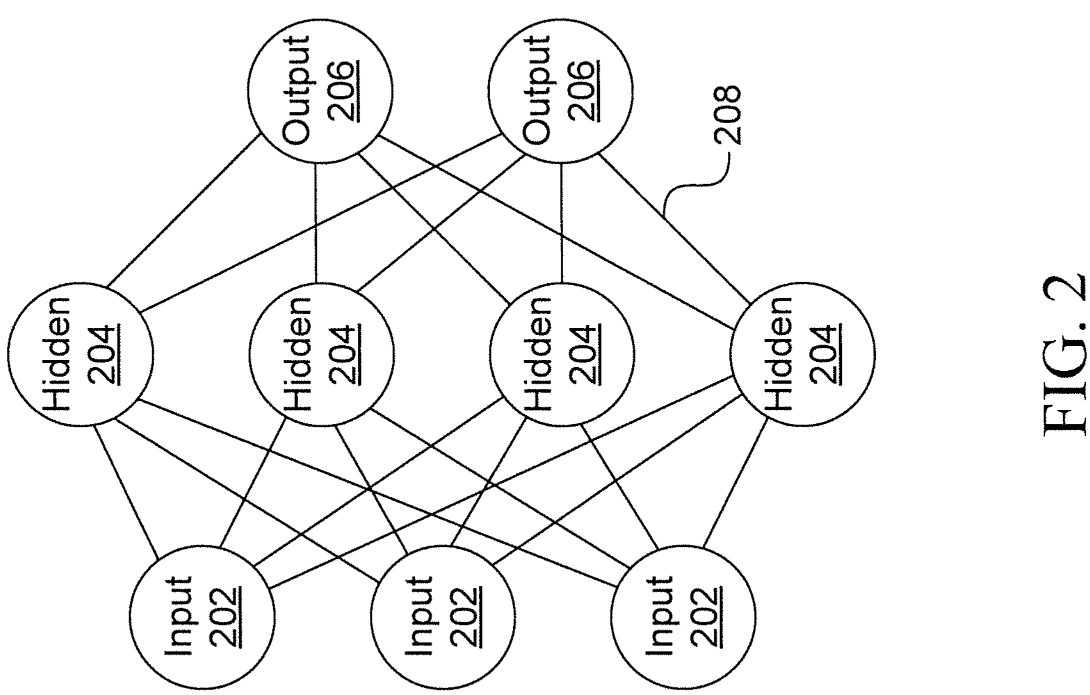
FIG. 2 is a block diagram showing an exemplary neural network to which the present invention can be applied, in accordance with an embodiment of the present invention.

Referring now to FIG. 2, a generalized diagram of an exemplary neural network to which the present invention can be applied is shown. ANNs demonstrate an ability to derive meaning from complicated or imprecise data and can be used to extract patterns and detect trends that are too complex to be detected by humans or other computer-based systems. The structure of a neural network is known generally to have input neurons 202 that provide information to one or more "hidden" neurons 204. Connections 208 between the input neurons 202 and hidden neurons 204 are weighted and these weighted inputs are then processed by the hidden neurons 204 according to some function in the hidden neurons 204, with weighted connections 208 between the layers. There can be any number of layers of hidden neurons 204, and as well as neurons that perform different functions. There exist different neural network structures as well, such as convolutional neural network, maxout network, etc. Finally, a set of output neurons 106 accepts and processes weighted input from the last set of hidden neurons 204.

This represents a "feed-forward" computation, where information propagates from input neurons 202 to the output neurons 206. Upon completion of a feed-forward computation, the output is compared to a desired output available from training data. The error relative to the training data is then processed in "feed-back" computation, where the hidden neurons 204 and input neurons 202 receive information regarding the error propagating backward from the output neurons 206. Once the backward error propagation has been completed, weight updates are performed, with the weighted connections 208 being updated to account for the received error. This represents just one variety of ANN.

Figure 3:
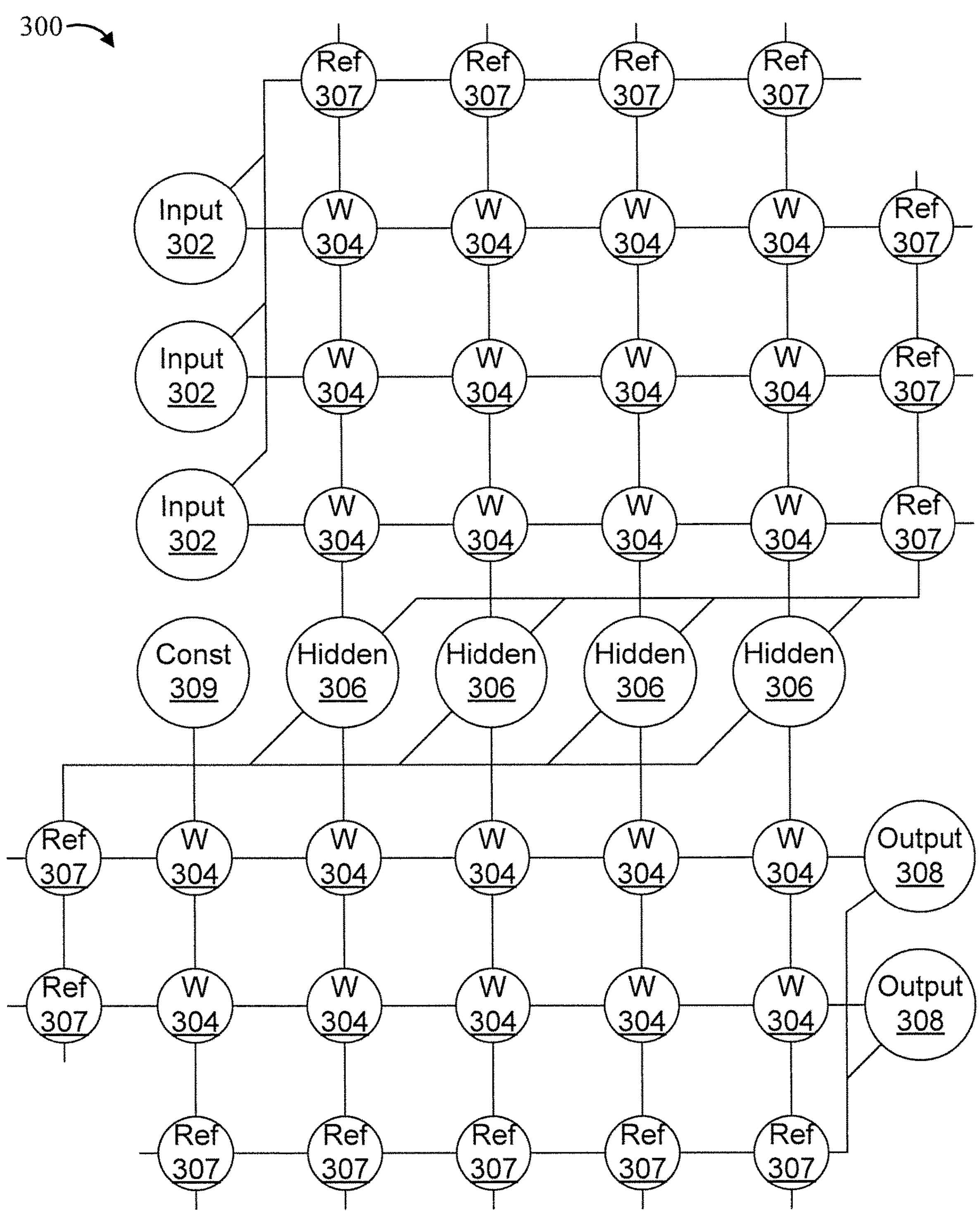
FIG. 3 is a block diagram showing an exemplary artificial neural network (ANN) architecture, in accordance with an embodiment of the present invention.

Referring now to the drawings in which like numerals represent the same or similar elements and initially to FIG. 3, an exemplary artificial neural network (ANN) architecture 300 to which the present invention can be applied is shown. It should be understood that the present architecture is purely exemplary and that other architectures or types of neural network can be used instead. In particular, while a hardware embodiment of an ANN is described herein, it should be understood that neural network architectures can be implemented or simulated in software. The hardware embodiment described herein is included with the intent of illustrating general principles of neural network computation at a high level of generality and should not be construed as limiting in any way.

Furthermore, the layers of neurons described below and the weights connecting them are described in a general manner and can be replaced by any type of neural network layers with any appropriate degree or type of interconnectivity. For example, layers can include convolutional layers, pooling layers, fully connected layers, softmax layers, or any other appropriate type of neural network layer. Furthermore, layers can be added or removed as needed and the weights can be omitted for more complicated forms of interconnection.

During feed-forward operation, a set of input neurons 302 each provide an input voltage in parallel to a respective row of weights 304. In the hardware embodiment described herein, the weights 304 each have a settable resistance value, such that a current output flows from the weight 304 to a respective hidden neuron 306 to represent the weighted input. In software embodiments, the weights 304 can simply be represented as coefficient values that are multiplied against the relevant neuron outputs.

Following the hardware embodiment, the current output by a given weight 304 is determined as $I=V/r$, where V is the input voltage from the input neuron 302 and r is the set resistance of the weight 304. The current from each weight adds column-wise and flows to a hidden neuron 306. A set of reference weights 307 have a fixed resistance and combine their outputs into a reference current that is provided to each of the hidden neurons 306. Because conductance values can only be positive numbers, some reference conductance is needed to encode both positive and negative values in the matrix. The currents produced by the weights 304 are continuously valued and positive, and therefore the reference weights 307 are used to provide a reference current, above which currents are considered to have positive values and below which currents are considered to have negative values. The use of reference weights 307 is not needed in software embodiments, where the values of outputs and weights can be precisely and directly obtained. As an alternative to using the reference weights 307, another embodiment can use separate arrays of weights 304 to capture negative values.

The hidden neurons 306 use the currents from the array of weights 304 and the reference weights 307 to perform some calculation. The hidden neurons 306 then output a voltage of their own to another array of weights 304. This array performs in the same way, with a column of weights 304 receiving a voltage from their respective hidden neuron 306 to produce a weighted current output that adds row-wise and is provided to the output neuron 308.

It should be understood that any number of these stages can be implemented, by interposing additional layers of arrays and hidden neurons 306. It should also be noted that some neurons can be constant neurons 309, which provide a constant output to the array. The constant neurons 309 can be present among the input neurons 302 and/or hidden neurons 306 and are only used during feed-forward operation.

During back propagation, the output neurons 308 provide a voltage back across the array of weights 304. The output layer compares the generated network response to training data and computes an error. The error is applied to the array as a voltage pulse, where the height and/or duration of the pulse is modulated proportional to the error value. In this example, a row of weights 304 receives a voltage from a respective output neuron 308 in parallel and converts that voltage into a current which adds column-wise to provide an input to hidden neurons 306. The hidden neurons 306 combine the weighted feedback signal with a derivative of its feed-forward calculation and stores an error value before outputting a feedback signal voltage to its respective column of weights 304. This back propagation travels through the entire network 300 until all hidden neurons 306 and the input neurons 302 have stored an error value.

During weight updates, the input neurons 302 and hidden neurons 306 apply a first weight update voltage forward and the output neurons 308 and hidden neurons 306 apply a second weight update voltage backward through the network 300. The combinations of these voltages create a state change within each weight 304, causing the weight 304 to take on a new resistance value. In this manner the weights 304 can be trained to adapt the neural network 300 to errors in its processing. It should be noted that the three modes of operation, feed forward, back propagation, and weight update, do not overlap with one another.

As noted above, the weights 304 can be implemented in software or in hardware, for example using relatively complicated weighting circuitry or using resistive cross point devices. Such resistive devices can have switching characteristics that have a non-linearity that can be used for processing data. The weights 304 can belong to a class of device called a resistive processing unit (RPU), because their non-linear characteristics are used to perform calculations in the neural network 300. The RPU devices can be implemented with resistive random access memory (RRAM), phase change memory (PCM), programmable metallization cell (PMC) memory, or any other device that has non-linear resistive switching characteristics. Such RPU devices can also be considered as memristive systems.

As description will now be given regarding various aspects of the present invention.

As is common for neural networks, there is a training phase where the network is trained and an inference phase where the network is used to generate a prediction (e.g., of a future event).

A description will now be given regarding an exemplary training phase that can be performed on a neural network configured in accordance with the present invention.

In the training phase, when parameters (e.g., connection weights in a neural network) are dumped while training a classifier, the change rate of each parameter when the dump is created is recorded in a memory. For example, regarding the change rate $\partial W$, the amount of change in each parameter W during the final epoch of the training can be used; $\partial W = W_{T_{dump}} - W_{T_{dump}-1}$. It is to be appreciated that the additional computation cost for this operation is negligible compared to the entire cost of training.

In the inference phase, when a local classification is made, a new classifier is created based on the dumped parameters W and change rates $\partial W$ using a small random number r as $W_{new} = W + r \times \partial W$. Due to the random numbers, a (slightly) different classifier can be used for each local prediction without training multiple classifiers. This makes the local predictions more independent relative to each other and improves the overall ensembled prediction accuracy. The preceding formula can be used for other parameters where $W_{view}$, W, $\partial W$ are replaced by variables corresponding to the other parameter (e.g., $C_{new}$, C, CW for coefficients in a regression, feature weights for a support vector machine, etc.).

Naive random mutation in parameters (without considering the change rate) may degrade accuracy of each local prediction in trade for yielding more local predictions independent each other. Thus, by mutating parameters based on the recorded change rates, the present invention avoids degradation in accuracy of each local prediction.

One or multiple random numbers can be used for parameters in a classifier. For example, one random number can be used for each layer of a CNN. As another example, different random numbers can be used for each parameter. These and other variations involving the random numbers are readily contemplated by one of ordinary skill in the art given the teachings of the present invention provided herein, while maintaining the spirit of the present invention.

Figure 4:
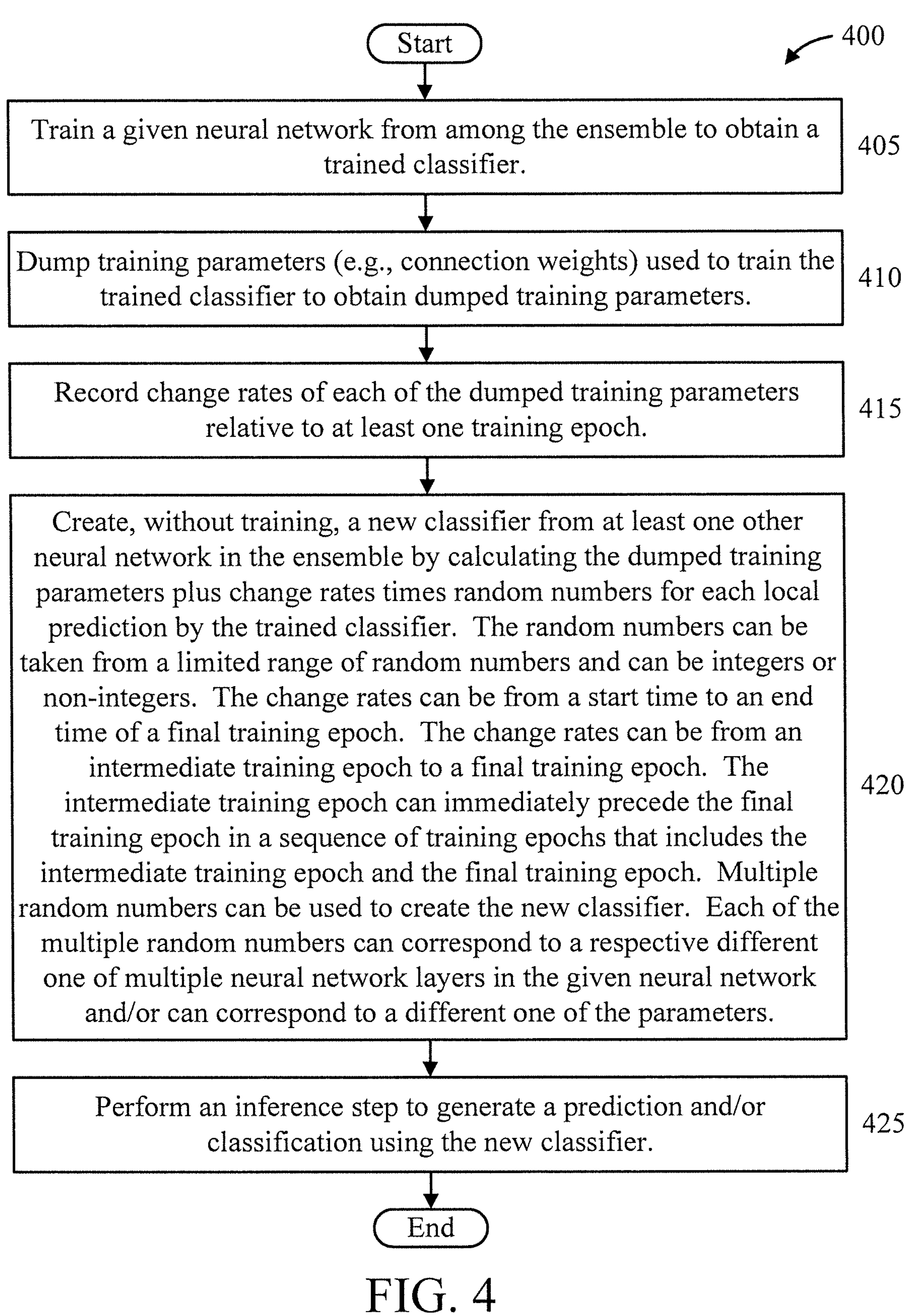
FIG. 4 is a flow diagram showing an exemplary method for reducing training costs in training an ensemble of neural networks, in accordance with an embodiment of the present invention.

FIG. 4 is a flow diagram showing an exemplary method for reducing training costs in training an ensemble of neural networks, in accordance with an embodiment of the present invention.

At block 405, train a given neural network from among the ensemble to obtain a trained classifier.

At block 410, dump parameters used to train the trained classifier to obtain dumped parameters. In an embodiment, the parameters used to train the trained classifier can be connection weights in the given neural network.

At block 415, record change rates of each of the dumped parameters relative to at least one training epoch. In an embodiment, block 410 can be performed responsive to the performance of block 405.

At block 420, create, without training, a new classifier from at least one other neural network in the ensemble by calculating the dumped parameters plus change rates times random numbers for each local prediction by the trained classifier. In an embodiment, the random numbers can be taken from a limited range of random numbers. The random numbers can be integers or non-integers. In an embodiment, the change rates can be from a start time to an end time of a final training epoch. In an embodiment, the change rates can be from an intermediate training epoch to a final training epoch. In an embodiment, the intermediate training epoch can immediately precede the final training epoch in a sequence of training epochs that includes the intermediate training epoch and the final training epoch. In other embodiments, other intermediate epochs and/or the starting epoch can be used. In an embodiment, multiple random numbers can be used to create the new classifier. In an embodiment, each of the multiple random numbers can correspond to a respective different one of multiple neural network layers in the given neural network. In an embodiment, each of the multiple random numbers can correspond to a different one of the parameters.

Thus, block 415 advantageously mutates the parameters based on the recorded change rate to avoid prediction accuracy degradation by the new classifier.

At block 425, perform an inference step to generate a prediction/classification using the new classifier.

A description will now be given regarding two further exemplary environments 500 and 600 to which the present invention can be applied, in accordance with various embodiments of the present invention. The environments 500 and 600 are described below with respect to FIGS. 5 and 6, respectively. In further detail, the environment 500 includes a touch sensitive control system operatively coupled to a controlled system, while the environment 6000 includes a touch sensitive control system as part of a controlled system. These and other environments to which the present invention can be applied are readily determined by one of ordinary skill in the art, given the teachings of the present invention provided herein, while maintaining the spirit of the present invention.

Figure 5:
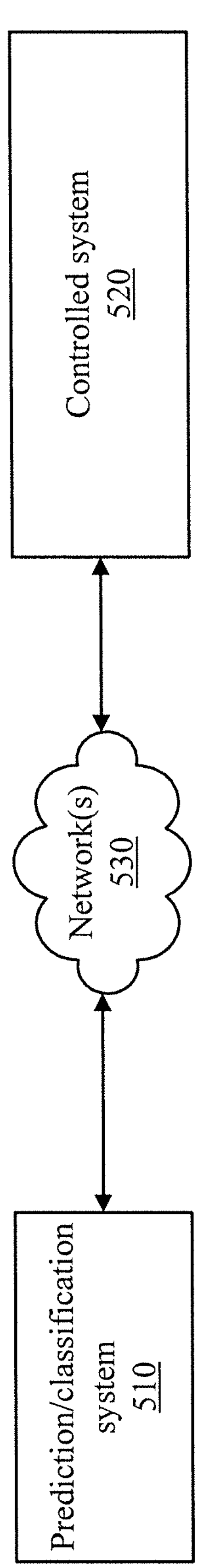
FIG. 5 is a block diagram showing a further exemplary environment to which the present invention can be applied, in accordance with an embodiment of the present invention.

FIG. 5 is a block diagram showing a further exemplary environment 500 to which the present invention can be applied, in accordance with an embodiment of the present invention.

The environment 500 includes a prediction/classification system 510 and a controlled system 520. The prediction/classification system 510 and the controlled system 520 are configured to enable communications therebetween. For example, transceivers and/or other types of communication devices including wireless, wired, and combinations thereof can be used. In an embodiment, communication between the prediction/classification system 510 and the controlled system 520 can be performed over one or more networks, collectively denoted by the figure reference numeral 530. The communication can include, but is not limited to, predictions/classifications and/or control actions from the prediction/classification system 520. The controlled system 520 can be any type of processor-based system.

In an embodiment, the action initiation control signals 510 can be implemented as a node in a cloud-computing arrangement. In an embodiment, a single action initiation control signals 510 can be assigned to a single controlled system or to multiple controlled systems e.g., different robots in an assembly line, and so forth). These and other configurations of the elements of environment 500 are readily determined by one of ordinary skill in the art given the teachings of the present invention provided herein, while maintaining the spirit of the present invention.

Figure 6:
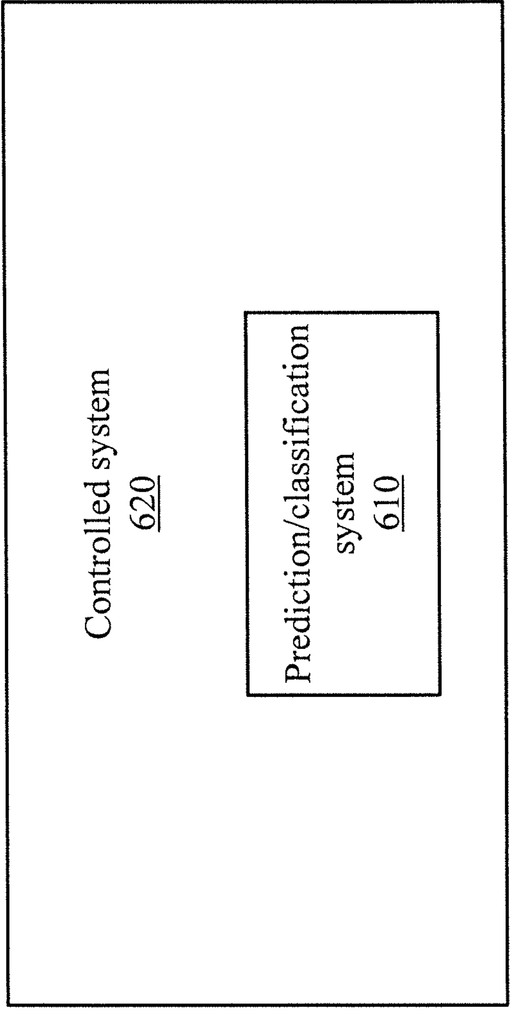
FIG. 6 is a block diagram showing another exemplary environment to which the present invention can be applied, in accordance with an embodiment of the present invention.

FIG. 6 is a block diagram showing another exemplary environment 600 to which the present invention can be applied, in accordance with an embodiment of the present invention.

The environment 600 includes a controlled system 620 that, in turn, includes a touch sensitive control system 610. One or more communication buses and/or other devices can be used to facilitate inter-system, as well as intra-system, communication. The controlled system 620 can be any type of processor-based system such as, for example, but not limited to, a manufacturing system (e.g., an assembly line) and so forth.

Other than system 610 being included in system 620, operations of these elements in environments 500 and 600 are similar. Accordingly, elements 610 and 620 are not described in further detail relative to FIG. 6 for the sake of brevity, with the reader respectively directed to the descriptions of elements 510 and 520 relative to environment 500 of FIG. 5 given the common functions of these elements in the two environments 500 and 600.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the “C” programming language or similar programming languages. The computer readable program instructions may execute entirely on the user’s computer, partly on the user’s computer, as a stand-alone software package, partly on the user’s computer and partly on a remote computer or entirely on the remote computer or server. In the latter scenario, the remote computer may be connected to the user’s computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to “one embodiment” or “an embodiment” of the present invention, as well as other variations thereof, means that a particular feature, structure, characteristic, and so forth described in connection with the embodiment is included in at least one embodiment of the present invention. Thus, the appearances of the phrase “in one embodiment” or “in an embodiment”, as well any other variations, appearing in various places throughout the specification are not necessarily all referring to the same embodiment.

It is to be appreciated that the use of any of the following “/”, “and/or”, and “at least one of”, for example, in the cases of “A/B”, “A and/or B” and “at least one of A and B”, is intended to encompass the selection of the first listed option (A) only, or the selection of the second listed option (B) only, or the selection of both options (A and B). As a further example, in the cases of “A, B, and/or C” and “at least one of A, B, and C”, such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for reducing training costs for an ensemble of machine-learning-based classifiers, the method comprising:

training, by a processor, a given machine-learning-based classifier from among the ensemble to obtain a trained classifier defined by non-hyper parameters;

dumping, by the processor, the non-hyper parameters of the trained classifier to obtain dumped parameters;

recording, by the processor, change rates of each of the dumped parameters; and mutating, by the processor, the trained classifier to generate a new classifier in the ensemble by, for each local prediction by the trained classifier, combining a random number and the change rates to with the dumped parameters to generate new non-hyper parameters that define the new classifier, wherein the combining generates the new classifier by while avoiding training and its requisite costs to improve computer efficiency.

2. The computer-implemented method of claim 1, wherein the dumped parameters used to train the trained classifier are connection weights in the given machine-learning-based classifier.

3. The computer-implemented method of claim 1, wherein said recording step is performed responsive to said dumping step.

4. The computer-implemented method of claim 1, wherein the new classifier is created for inference use in an absence of explicitly training the new classifier.

5. The computer-implemented method of claim 1, wherein the mutating mutates the dumped parameters based on the recorded change rate to avoid prediction accuracy degradation by the new classifier.

6. The computer-implemented method of claim 1, wherein the random numbers are taken from a limited range of random numbers.

7. The computer-implemented method of claim 1, wherein the change rates are from a start time to an end time of a final training epoch.

8. The computer-implement method of claim 1, wherein the change rates are from an intermediate training epoch to a final training epoch, and wherein the intermediate training epoch immediately precedes the final training epoch in a sequence of training epochs including the intermediate training epoch and the final training epoch.

9. The computer-implemented method of claim 1, wherein multiple random numbers are used to create the new classifier, each of the multiple random numbers corresponding to a respective different one of a plurality of machine-learning-based classifier layers in the given machine-learning-based classifier.

10. The computer implemented method of claim 1, wherein multiple random numbers are used to create the new classifiers, each of the multiple random numbers corresponding to a different one of the dumped parameters.

11. A computer program product for reducing training costs for an ensemble of machine-learning-based classifiers, the computer program product comprising a non-transitory computer readable storage medium having program instructions embodied therewith, the program instructions executable by a computer to cause the computer to perform a method comprising:

training, by a processor of the computer, a given machine-learning-based classifier from among the ensemble to obtain a trained classifier defined by non-hyper parameters;

dumping, by the processor, the non-hyper parameters of the trained classifier to obtain dumped parameters;

recording, by the processor, change rates of each of the dumped parameters; and mutating, by the processor, the trained classifier to generate a new classifier in the ensemble by, for each local prediction by the trained classifier, combining a random number and the change rates with the dumped parameters to generate new non-hyper parameters that define the new classifier, wherein the combining generates the new classifier while avoiding training and its requisite costs to improve computer efficiency.

12. The computer program product of claim 11, wherein the dumped parameters used to train the trained classifier are connection weights in the given machine-learning-based classifier.

13. The computer program product of claim 11, wherein said recording step is performed responsive to said dumping step.

14. The computer program product of claim 11, wherein the new classifier is created for inference use in an absence of explicitly training the new classifier.

15. The computer program product of claim 11, wherein mutating mutates the dumped parameters based on the recorded change rate to avoid prediction accuracy degradation by the new classifier.

16. The computer program product of claim 11, wherein the random numbers are taken from a limited range of random numbers.

17. The computer program product of claim 11, wherein the change rates are from a start time to an end time of a final training epoch.

18. The computer program product of claim 11, wherein the change rates are from an intermediate training epoch to a final training epoch, and wherein the intermediate training epoch immediately precedes the final training epoch in a sequence of training epocha including the intermediate training epoch and the final training epoch.

19. The computer program product of claim 11, wherein multiple random numbers are used to create the new classifier, each of the multiple random numbers corresponding to a respective different one of a plurality of machine-learning-based classifier layers in the given machine-learning-based classifier.

20. A computer processing system for reducing training costa for an ensemble of machine-learning-based classifiers, the system comprising:

a memory for storing program code; and a hardware processor for running the program code to train a given machine-learning-based classifier from among the ensemble to obtain a trained classifier defined by non-hyper parameters;

dump the non-hyper parameters of the trained classifier to obtain dumped parameters;

record change rates of each of the dumped parameters; and mutate the trained classifier to generate a new trained classifier in the ensemble by, for each local prediction by the trained classifier, combining a random number and the change rates with the dumped parameters to generate new non-hyper parameters that define the new classifier, wherein the combining generates the new classifier while avoiding training and its requisite costs to improve computer efficiency.

* * * * *